United States Patent [19]

Soszka et al.

[11] Patent Number: 4,853,021

[45] Date of Patent: Aug. 1, 1989

[54] PROCESS AND APPARATUS FOR PRODUCING COATED SINGLE TWIST GLASS YARNS

[75] Inventors: Barbara Soszka, Chambery; Robert Federowsky, Aix-les-Bains; Jacques Mahler, Chambery, all of France

[73] Assignee: Vetrotex Saint-Gobain, Chambery, France

[21] Appl. No.: 127,732

[22] Filed: Dec. 2, 1987

[30] Foreign Application Priority Data

Dec. 4, 1986 [FR] France ................................ 86-16971

[51] Int. Cl.$^4$ ........................ C03B 37/10; C03C 25/02
[52] U.S. Cl. ............................................ 65/2; 57/249; 57/250; 57/286; 65/3.43; 65/11.1
[58] Field of Search ................. 65/2, 3.43, 11.1, 3.44; 57/249, 250, 286; 427/386, 387, 389.9; 428/361, 371

[56] References Cited

U.S. PATENT DOCUMENTS

| | | | |
|---|---|---|---|
| 3,425,208 | 2/1969 | Shippee et al. | 57/286 |
| 3,496,717 | 2/1970 | Costello et al. | 65/3.43 X |
| 3,918,947 | 11/1975 | Maaghul et al. | 65/3.43 |
| 4,339,915 | 8/1982 | Dammann et al. | 57/339 |
| 4,370,853 | 2/1983 | Bauer et al. | 57/340 |
| 4,377,932 | 3/1983 | Dammann et al. | 57/336 |
| 4,414,803 | 11/1983 | Dammann et al. | 57/340 |
| 4,424,664 | 1/1984 | Bauer et al. | 57/338 |

FOREIGN PATENT DOCUMENTS

| | | |
|---|---|---|
| 0022552 | 7/1980 | European Pat. Off. |
| 1455241 | 10/1966 | France |
| 2184075 | 12/1973 | France |
| 2277913 | 2/1976 | France |

*Primary Examiner*—Robert L. Lindsay
*Attorney, Agent, or Firm*—Pennie & Edmonds

[57] ABSTRACT

A process for producing coated, single twist glass yarns which comprises drawing a plurality of fibers formed from fibers of molten glass, applying to the fibers a sizing comprising a thermoplastic, thermosetting or photosetting composition, gathering the coated fibers into a yarn, imparting a continuous rotative twisting movement to the coated yarn and curing the coated yarn so as to polymerize and/or crosslink the sizing coating. An apparatus for performing this process comprises a spinneret having a plurality of nozzles or orifices from which fibers of molten glass are discharged; means for drawing a plurality of glass fibers from the spinneret; at least one coating applicator for applying the sizing coating to the glass fibers; guide means for gathering the coated fibers into a yarn; means for imparting a single twist to the coated yarn, such as a strap spindle device and means for curing the sizing coating wherein the coating is crosslinked and/or polymerized.

29 Claims, 2 Drawing Sheets

PROCESS AND APPARATUS FOR PRODUCING COATED SINGLE TWIST GLASS YARNS

TECHNICAL FIELD

The present invention relates to a process and an apparatus for producing a continuous glass yarn to which a single twist is imparted during its drawing. The invention also relates to an apparatus for carrying out this process and to the products thus obtained.

BACKGROUND OF THE INVENTION

Continuous glass yarns are normally provided with a twist which facilitates their use in various textile operations such as covering, braiding and weaving. To obtain such a yarn utilizing current techniques, it is necessary to proceed in three stages.

The initial step comprises the preparation of a coil formed of at least one yarn, which is itself made up of a large number of fibers mechanically drawn from molten glass streams. Generally, these fibers are coated with a sizing in an aqueous solution. In a second step, a portion of the water is eliminated from the coil by drying or upon storing the coil for a period of time. The third step comprises placing the coil on a spinning machine, unwinding the yarn and subsequently imparting to it a single twist before winding it up in this condition on a suitable support.

These operations require a substantial investment of time and energy, together with the purchase of various types of equipment as well as the requirement of procuring a location for installing the equipment. The start-up costs required for the construction of such a production line are particularly high and the cost of the yarn thus produced is therefore greatly increased. A simplification of the prior art process, i.e., by reducing, for example, the number of operations required to arrive at the desired product, would exhibit an immediate economic advantage.

Giving a twist to the yarn imparts to it a greater integrity due to a better cohesion of the fibers which form the yarn, i.e., better than in the fibers of an ordinary yarn. This quality makes it possible to envisage other applications for which the single yarn twist may be used, for example, as a continuous yarn mat or as cut yarn. In applications related to the field of textiles, a process such as that disclosed herein which would make it possible to achieve in a single step the production of a yarn having a single twist would constitute a considerable improvement to presently utilized techniques.

The method disclosed in U.S. Pat. No. 3,250,602 is one example of such an application in this field. Glass yarns are generally drawn from stationary spinnerets supplied with cold glass, in the form of balls, for example, or with molten glass coming directly from a melting furnace. Conversely, the process disclosed and claimed by the '602 patent comprises mechanically drawing a plurality of glass fibers from molten glass streams flowing from a multiplicity of orifices drilled at the base or at the periphery of a rotary spinneret.

Due to the effect of the resultant centrifugal forces, the fibers separate from the axis of rotation of the spinneret as soon as they are formed. They are then gathered below the spinneret by an assembly loop. At this location, the fibers are formed into a yarn due to a twist imparted by the rotation of the spinneret, which directly gives rise to a single twist yarn.

The process of the '602 patent; however, requires an installation which must exhibit very particular characteristics, particularly for the spinneret, which must support very high rotation speeds without deforming too quickly. Additionally, such an installation may be used only for the production of a yarn having a single twist.

SUMMARY OF THE INVENTION

One object of the present invention is to achieve in a single step the production of a glass yarn with a single twist, from approximately cylindrical fibers formed only by mechanical drawing.

Applicants' invention also has as its object to provide an apparatus making it possible to produce such a single twist yarn with a stationary spinneret.

The first of these objects is attained by a process which comprises mechanically drawing a large number of glass fibers from glass streams flowing from a multiplicity of orifices located at the base of a stationary spinneret; at least partially coating these fibers with a thermoplastic, thermosetting or photosetting sizing, either in the molten state or in the form of an emulsion, suspension or solution in a suitable solvent; gathering the fibers into at least one yarn; imparting a continuous rotative movement to the yarn and curing the sizing on the twisted yarn thus obtained.

In order to produce a predetermined twist in the yarn, the rotative movement may be imparted by any means commonly used for this purpose in the textile industry. Thus, the yarn may be twisted by devices which operate by friction as well as those which rely upon the action of a gas flow, such as a jet of turbulent air.

Depending both on the speed of rotation imparted to the yarn and its drawing speed, the twist may begin to appear at a great distance from the location where the yarn is originally formed, i.e., where the fibers are initially gathered together. Under certain conditions, the twist stress may even reach the still separate fibers. For reasons which will be explained below, it may even be advantageous that this twist stress first appears on the slightly separate fibers upstream from where they are coated with the sizing.

The sizing used in the process of this invention may comprise a number of different ingredients, depending on the intended use for the single twist yarn thus obtained. For example, when the yarn is intended for use in reinforcing an organic matrix, the sizing selected to coat the yarn should preferably be chemically compatible with this matrix. The sizing may also be selected as a function of its ability to be removed from the yarn during a desizing operation. Additionally, the sizing may also be selected for its chemical strength with regard to a medium in which the yarn is incorporated, for example, a cement-based matrix. Further, in addition to its major constituents, the sizing may include one or more additives such as pigments, plasticizers, emulsifiers, softening agents, coupling agents, etc.

Thus, the sizing deposited on a single twist yarn produced by the method of the present invention may, for example, comprise a thermoplastic composition such as a nonaqueous compound having a base of microcrystalline or amorphous, natural or synthetic waxes. To this basic composition may be added various additives, including polyethylenes, polyacrylates, polyamides, polyvinyl acetates, etc. Compositions of this type are described in U.S. Pat. Nos. 2,723,215, 4,567,102 and 4,581,392.

The sizing composition may alternately comprise or include a thermosetting compound. By the term "thermosetting", applicants mean to include any mixture which hardens solely as a result of being subjected to a rise in temperature. Thus, the sizing may comprise, for example, an aqueous thermosetting composition having an emulsion base formed of one or more polyester resins comprising nonsaturated organic peroxide emulsions, such as, for example, alpha-alpha' bis-tertiobutyl peroxy diisopropyl benzene.

Further, the sizing may also comprise a photosetting composition which is cured as a result of a photochemical reaction. Such a composition contains at least one constituent that reacts due to the effect of actinic radiation. By actinic radiation, applicants mean any radiation able to produce chemical reactions, such as ultraviolet radiation, radiation emitted by a laser or an electron beam. Examples of sizing compositions utilizing these materials are described in U.S. patent application Ser. No. 042,200 filed on Apr. 23, 1987, the text of which is expressly incorporated herein by reference.

One example of a photosetting finish that can be used in the context of the present invention comprises at least one monounsaturated or polyunsaturated oligomer, at least one photoinitiator and, optionally, at least one organic solvent and/or at least one mono- or polyunsaturated monomer.

The oligomers utilized may include, for example, acrylate polyesters, modified starches and cellulose, acrylate epoxies, compounds coated with silicon and acrylate urethanes. The photoinitiator compounds are preferably selected from the following compounds: benzoin, acetophenone, benzophenone, sulfonylacetophenone and their respective derivatives, as well as the thioxanthones.

A second type of photosetting sizing composition, which may also be used in the context of the present invention, comprises at least one monounsaturated or polyunsaturated monomer, at least one photoinitiator and, optionally, at least one organic solvent. The monomers used are, preferably, acrylic monomers such as hexane diol diacrylate or trimethylol propane triacrylate. The photoinitiators are selected, preferably, from those mentioned above. However, even with the removal of the photoinitiator composition, a workable sizing may still be obtained by using an electron beam to cure the coating.

It is an object of the invention to ensure that the threads are twisted prior to the curing, i.e., polymerization, of the sizing upon the yarn since it is the polymerization of the sizing which serves to maintain the state of the twist. Therefore, by permitting the sizing to set, i.e., cure, on the single twist yarn prior to winding it, the yarn will maintain its twist perfectly, which will ensure a high degree of integrity in the finished product.

Both the nature of the sizing and the amount thereof which is to be deposited on the yarn is normally selected as a function of the method of its application. The amount of sizing to be applied is governed by various factors, such as the viscosity of the sizing, the type of device used to deposit it, the drawing speed of the yarn and the twist given to the yarn. This twist is particularly important when the fibers are oriented in a fan-like arrangement which is then coated by a film of sizing deposited by a rotating roller. The amount may thus vary between several percent and eighty to ninety percent of the weight of the yarn to be coated thereby.

It is also possible, under certain conditions, to cause the twist stress to run back to the level of the individual fibers, upstream from the zone where they are to be coated with the sizing. Due to the effect of this twist stress, the layer of fibers may become slightly warped, which has the result of altering the position of the fibers in relation to the surface of the roller delivering the sizing. Because of this, the contact zone between the sizing coating and a large number of fibers is reduced. In some instances, a certain number of fibers remain completely devoid of sizing. Moreover, all conditions being equal, imparting a twist to the fibers is a means of reducing the amount of sizing deposited.

When the sizing comprises a thermoplastic composition, it is first heated and then deposited in the molten state on the fibers. Its setting therefore occurs upon cooling. In fact, the contact of the sizing with the ambient atmosphere, soon after it is deposited on the fibers, is sometimes by itself sufficient to obtain the desired cure before the single twist yarn is wound, particularly when the amount of sizing to be deposited is minimal.

When the amount of sizing to be deposited on the yarn is considerable, e.g., greater than thirty percent of the weight of yarn 16, it is then generally necessary to increase the speed with which the sizing is cooled. This can easily be done by subjecting the yarn to the action of a cooling fluid such as air or sprayed water.

When the sizing comprises a thermosetting composition, it may be cured by subjecting the single twist yarn to the action of at least one heat source along at least part of its path.

The time necessary to obtain the desired setting before the winding of the yarn is again a function of several factors: the amount of sizing deposited on the yarn, the nature of the sizing composition, the drawing speed of the fibers, etc. The means to be used, i.e., the number of heat sources, the length of the path during which the yarn is to be heat-treated, etc., also depends upon these factors.

The sizing may further comprise a photosetting composition that sets essentially under the influence of a source of actinic radiation.

As for other sizings, the time necessary to obtain the required degree of setting differs from one case to the next. The means to be used for curing such finishes are, for example, described in French Patent Application No. 86-05938.

It is, of course, possible to combine the action of actinic radiation with that of heat, simultaneously or successively, in order to cure sizing coatings comprising a mixture of photosetting and thermosetting compositions.

BRIEF DESCRIPTION OF THE DRAWINGS

The process according to the invention will be better appreciated through the following detailed description of one specific embodiment of the invention. This description is illustrated with several drawing figures in which.

DETAILED DESCRIPTION OF THE PREFERRED EMBODIMENTS

Figure 1:
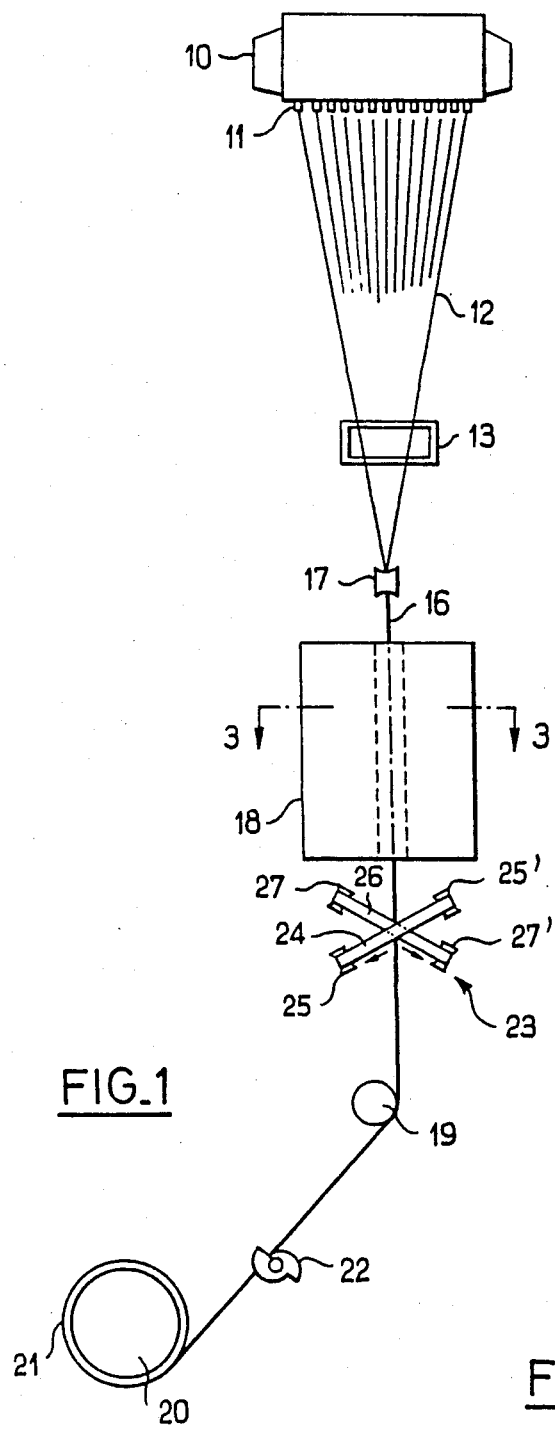
FIG. 1 is a front schematic view of the apparatus of the invention.
Figure 2:
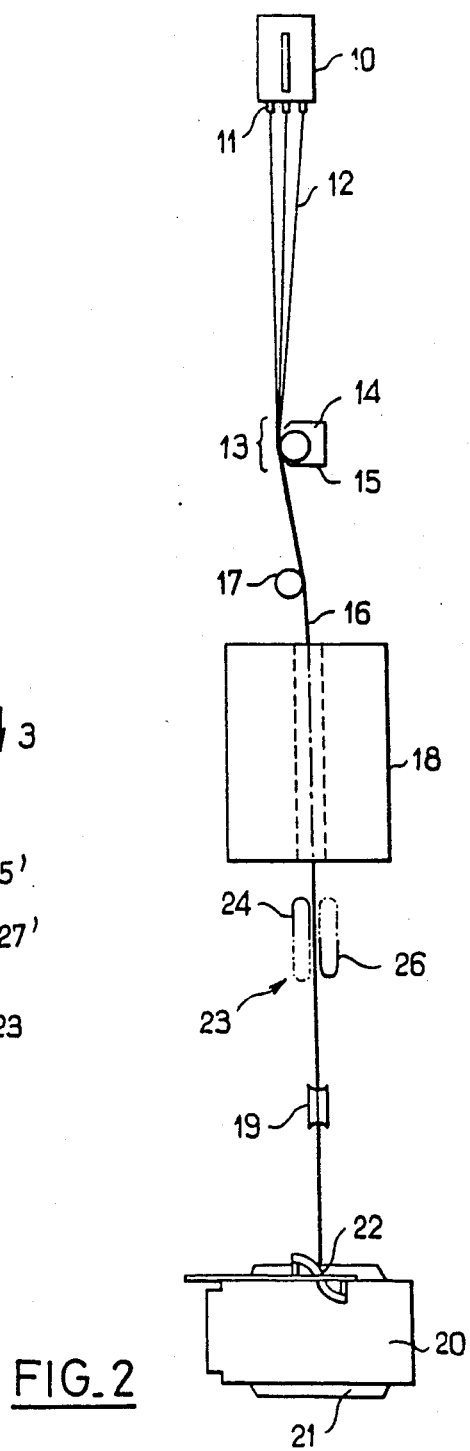
FIG. 2 is a side schematic view of the apparatus shown in FIG. 1.

Referring initially to FIGS. 1 and 2, the apparatus of the invention comprises spinneret 10, generally constructed of a metal alloy and heated by the Joule effect, i.e., the effect due to the first law of thermodynamics regarding the incontrovertability of the various forms of energy. The spinneret is used either to maintain in a liquid state a supply of molten glass provided by a source such as a float bath (not shown) or to remelt glass originally supplied in the molten state but which has subsequently become solidified.

The bottom of spinneret 10 is pierced with a large number of orifices, which may optionally be extended by hollow studs 11 or tips from which strands of molten glass are discharged. These streams are mechanically drawn to give rise to continuous glass fibers 12.

Fibers 12, which are initially arrayed in at least one fanned layer, pass over coating device 13 which deposits a layer of the sizing coating thereupon. Coating device 13 preferably comprises a roller 14, whose lower portion is bathed in a supply 15 of the sizing composition. Roller 14 may be associated with a doctor blade (not shown) to form a uniform layer of the sizing on the surface of the roller. This device is described in European Patent No. 0 002 006.

The sizing may, of course, be deposited on fibers 12 by alternate means well known to those of ordinary skill in the art, such as spray techniques, a working hole fed by a metering pump and foam devices. The use of these techniques are determined as a function of the viscosity of the sizing and/or of the amount of sizing to be deposited on the fibers.

It is also possible to separately deposit the constituents of the sizing on fibers 12. Thus, it is possible, for example, to deposit one sizing material, such as a silane, on fibers 12 with coating device 13, followed by a second sizing deposited with a second coating device. The second device may optionally be identical with the first and placed downstream from it.

In the embodiment selected to illustrate the invention, fibers 12 may be coated with a photosetting finish whose composition reacts due to the action of an actinic radiation. This is only one of several embodiments of the present invention, however, and should not be considered as limiting the process of the invention.

The coated fibers which result from this operation are gathered into at least one yarn 16 by an element such as an assembly wheel 17. Yarn 16 then passes through irradiation apparatus 18 where it is subjected to a sufficient degree of actinic radiation to polymerize and/or crosslink the sizing on the surface of the yarn. As noted above, this irradiation technique is only one of several ways in which the sizing may be cured on the surface of the coated fibers. The invention should not be limited to this apparatus, however.

At the outlet of device 18, yarn 16 travels over a guide element, for example, a small wheel 19, before being wound on a rotating spindle 20. Spindle 20 is moved by a motor fastened to a frame (not shown). Yarn 16 is then directed into winding 21 by distribution element 22.

Rather than being drawn by a rotating spindle, the yarn may instead be drawn by a drawing wheel and then distributed on a conveyor, according to the processes and devices described, for example, in U.S. Pat. Nos. 3,467,739 and 3,676,095. Alternately, the yarn may also be drawn by a cutting machine as is provided, for example, in U.S. Pat. No. 4,406,196. In the latter case, the single twist yarn, because of its structure, is not squashed between the wheels of the cutting machine in contrast with what happens to an ordinary yarn.

A device 23 for imparting a twist to yarn 16 is installed between irradiation apparatus 18 and guide element 19. One example of a device 23 is well known in the textile industry as a strap spindle. Strap spindle 23, therefore, comprises two endless belts 24 and 26, stretched respectively by two pulleys 25, 25' and 27, 27' which are connected to a motor (not shown). When the motor is operating, the pulleys transmit a continuous rotative movement to belts 24 and 26 in a direction indicated by the arrows. Yarn 16 is wedged between these belts and is thus twisted as the belts are rotated.

Under certain conditions, the two belts 24, 26 may be placed opposite one another, their displacing movement being approximately perpendicular to yarn 16. In this position, however, strap spindle device 23 has a tendency to overbrake the drawing of the yarn. This can be avoided by increasing the drawing speed. However, if the speed of the belts is kept constant, the increase in the drawing speed will result in a lesser amount of twist.

To avoid these drawbacks, it is preferable to place the belts diagonally, as shown in FIGS. 1 and 2. In FIG. 2, strap spindle device 23 is symbolized by single belts 24 and 26 wherein the portions in front of the plane of the sheet are shown as solid lines while the rear portions of said plane are shown by a dotted line. In this position, the movement of the belts, as indicated by the arrows, causes not only a twist in yarn 16 but they also create a force which contributes to the drawing of yarn 16. This force may be accentuated or attenuated by modifying, as a consequence, the angular arrangement of belts 24 and 26. The amount of twist imparted to yarn 16 may thus be regulated by varying the rotation speed of strap spindle device 23, the drawing speed of yarn 16 or the ratio between these two factors.

In the embodiment described herein, the twist on yarn 16 should begin to appear on the yarn prior its entry into irradiation apparatus 18. This condition must be observed if it is desired to determine the twist occurring due to the polymerization of the size. This twist may even run back to the level of assembly wheel 17, indeed even up to the level of fibers 12 slightly upstream from coating device 13.

Under certain conditions, particularly when the drawing speed of yarn 16 is low, it is possible to use a process based on the application of a false twist to the yarn by means of a jet of air introduced under high pressure. An example of this procedure is the "Toray" process, described in "L'Industrie Textile", No. 1166, 5/86, 485-492. The device for using this process is equipped with a single nozzle and may be placed downstream from irradiation apparatus 18, as indicated above. It may also, however, be placed between assembly wheel 17 and irradiation apparatus 18.

Figure 4:
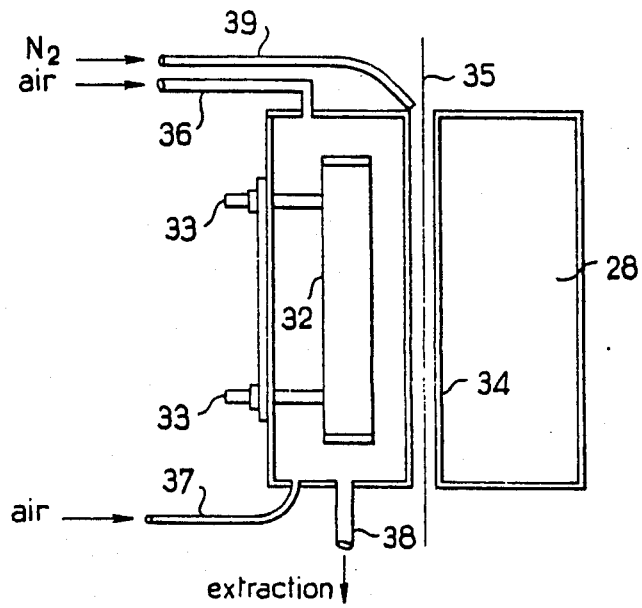
FIG. 4 is a sectional view taken along line 4—4 of FIG. 3.
Figure 3:
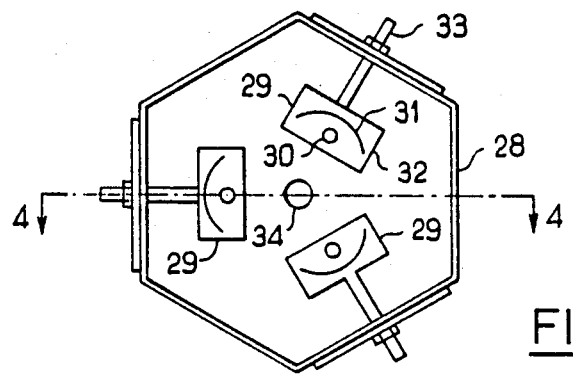
FIG. 3 is a cross sectional view taken along line 3—3 of FIG. 1.

The structure of irradiation apparatus 18 is illustrated in FIGS. 3 and 4. This device is composed of a ventilated enclosure, several sources for emitting actinic radiation and an electric control device (not shown).

In the embodiment depicted in FIG. 3, the enclosure is bounded by hexagonal chamber 28 containing three radiation emitting sources 29 placed 120° apart in relation to one another. Each source 29 utilizes an emitting tube 30. Tube 30 can be excited at high, medium or low pressure, through the use of electrodes or microwaves. It is specifically selected as a function of its emission spectrum. It may, therefore, be doped with rare gases or metals, depending on the type of product which is sought.

A semi-elliptical reflector 31 is positioned directly behind each tube 30. Each tube-reflector unit is mounted in a case 32 which is attached to the wall of chamber 28a by sliding rod 33. Rods 33 make it possible to adjust the distance separating emitting tubes 30 from coated yarn 35. The adjustment is made so that the focal points for each semi-elliptical reflector 31 may be merged with the path of yarn 35.

A silica tube 34 may be placed vertically in the axis of chamber 28, along its entire height. The purpose of tube 34 is to protect emitters 30 from being accidentally sprayed with the sizing coating. It is also possible to protect the emitters directly through the use of silica windows. In this case, tube 34 is no longer required. Yarn 35, guided by elements 17 and 19, advances within the axis of tube 34.

Chamber 28 is further equipped with conduits 36 and 37 in its upper and lower zones which facilitate the passage of compressed air used to ventilate the inside of chamber 28. This air is then removed through conduit 38. An additional conduit 39, directed to the upper portion of tube 35, makes it possible to deliver a current of an inert gas such as nitrogen. This additional gas permits yarn 35 to be surrounded with an inert atmosphere within the irradiation zone, such as when the sizing is treated with actinic radiation, so as to accelerate the polymerization reaction upon the surface of yarn 35.

Figure 5:
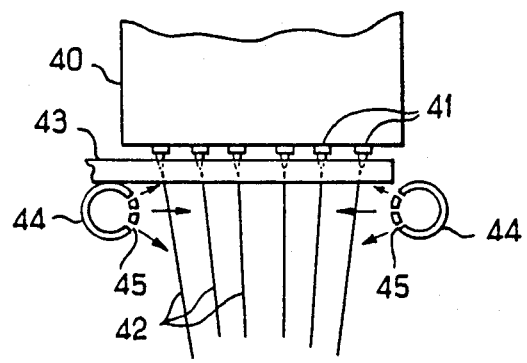
FIG. 5 is a partial, front schematic view of an alternate embodiment of applicants' apparatus.

Turning now to FIG. 5, the apparatus illustrated therein may optionally be included in an alternate embodiment of the device schematically illustrated by FIGS. 1 and 2. FIG. 5 illustrates a lower portion of spinneret 40 equipped with studs (i.e., "tips") 41 from which glass fibers 42 are drawn. The bottom of spinneret 40 is further equipped with a series of cooling fins 43, regularly installed between rows of studs 41. Immediately below fins 43, ducts 44 may be installed on either side of spinneret 40, parallel to the longest sides thereof. The wall of each duct 44 is pierced with one or more rows of orifices or slots 45, directed toward the fiber-drawing zone.

During the fiber-drawing operation, ducts 44 are supplied with a dry, inert gas such as nitrogen which is blown through orifices 45 in the direction of fibers 42, so as to surround fibers 42 as soon as they are formed. The fibers become entrained within the dry gas, which forms a gaseous envelope around them that accompanies them as they move.

The use of this gaseous envelope effectively prevents or at least limits considerably the contact between the surface of the fibers and the water contained in the atmosphere, thus preventing any reduction in the mechanical properties of the yarn. Thus, it is now possible to produce a single twist yarn with applicants' process and apparatus whose tensile strength is particularly high, a characteristic that is very desirable in textile applications.

EXAMPLES

The following examples were performed with an apparatus for irradiating yarn similar to the one described above. The amount of radiation delivered was variable, ranging generally between about 50 and 200 watts per linear centimeter of emitting tube 30. The wavelength of the radiation emitted was between about 200 and 420 nanometers.

Under these test conditions and for amounts of finish between about 15% and 30% by weight of yarn 16, the amount of polymerized size in relation to the total amount of finish deposited is often greater than 75% as the following examples illustrate. These examples are disclosed for the purposes of illustration only and are not to be construed as limiting the scope of the invention in any manner.

EXAMPLE 1

| | |
|---|---|
| Oligomer: epoxyacrylate (marketed under the trade name "Ebecryl 600" by the Societe Union Chimique Belge) | 55.8% |
| Monomer: hexane diol diacrylate | 18.6% |
| Photoinitiators: benzyl dimethyl ketal | 10.6% |
| Solvent: methyl ethyl ketone | 15.0% |
| Amount of finish deposited on the yarn | 15.6% |
| Amount of polymerized finish in relation to the preceding amount | 100% |

EXAMPLE 2

| | |
|---|---|
| Drawing speed of the yarn | 30 m/sec |
| Composition by weight of the size | |
| Oligomer: polyester tetracrylate (Ebecryl 810) | 77.27% |
| Photoinitiator: hydroxy-1-cyclohexyl phenylketone | 7.73% |
| Solvent: methyl ethyl ketone | 15.0% |
| Softening agent: diethyl polyacrylate (marketed under the trade name "Modaflow" by the Monsanto Company) | 0.20% |
| Amount of finish deposited on the yarn | 30% |
| Amount of polymerized size in relation to the preceding amount | 79% |

When the amount of sizing deposited upon the yarn is only several percent of the weight of yarn 16, the polymerization of the sizing is usually complete, even for drawing speeds greater than about 30 meters per second.

In the case of thermosetting sizings, i.e., those that can be polymerized by the action of heat, the coated yarn 35 may be heated by any known means, e.g., with microwaves or infrared radiation. Reflectors are advantageously placed behind each of these radiation sources to concentrate the radiation upon yarn 35. As for photosetting sizings, i.e., those that polymerize due to the action of actinic radiation, the twist should begin to appear before yarn 35 is treated. In the case of thermoplastic finishes, i.e., those that cure upon cooling, it is possible to accelerate this cooling effect by subjecting coated yarn 35 to the action of a liquid or gaseous fluid.

The coated yarn 35 may be cooled by installing one or more nozzles directed toward the yarn, upstream from the device imparting the twist to it. It is possible to blow cooled air and/or to spray water through these nozzles so as to reduce the temperature of coated yarn 35 and thus permit a more rapid polymerization reaction.

A particularly effective method comprises passing the single twist yarn through a tube, such as tube 34. This tube can be in a single piece, as shown by silica tube 34, or it can be opened along a generatrix which facilitates the positioning of the yarn at the time of restarting the spinneret. One or more nozzles, shown as connected to conduit 39, may be installed at the upper opening of tube 34. By this means, the contact time between the yarn and the cooling fluid is considerably increased, which therefore increases the cooling speed of coated yarn 35.

After the passage of the yarn through irradiation apparatus 18, which facilitates the curing of the sizing composition, the sizing may not be completely set. This is the case, for example, when the amount of sizing deposited on the yarn is considerable and/or when the drawing speed of the yarn is high. It is possible to complete the curing of the sizing by installing a second irradiation device 18 between guide element 19 and mechanical drawing element 20. In this case, it is preferable that the path of yarn 16 be approximately horizontal between elements 19 and 20. With such an installation, it is actually easy to have several yarns 16 pass through the device, coming from several installations similar to the one represented in FIGS. 1 and 2, to achieve the curing of the sizing which covers them.

By using one or the other of the above means, or by combining several of them, the process according to the invention and the devices for using said process make it possible to obtain, as desired, single twist yarns suitable for applications such as purely textile applications or the reinforcement of organic matrices or of cement-based matrices.

While it is apparent that the invention herein described is well calculated to fulfill the objectives stated above, it will be appreciated that numerous modifications may be devised by those skilled in the art, and it is intended that the appended claims cover all such modifications and embodiments as fall within the true spirit and scope of the present invention.

We claim:

1. A process for producing a single twist coated glass yarn which comprises;
    drawing a plurality of fibers from a source of glass wherein said source is heated above a melting point of said glass
    at least partially coating only an outer surface of said glass fibers, directly after said fibers exit said source, with a sizing coating capable of a polymerization and/or crosslinking reaction upon said surface;
    gathering said coated fibers into a yarn;
    imparting a continuous rotative twisting movement to said coated yarn; and
    treating said coated yarn to polymerize and/or crosslink said sizing coating upon said surface.

2. The process of claim 1 wherein said continuous rotative movement is imparted to said coated yarn by passing said yarn through friction means.

3. The process of claim 2 wherein said friction means is a strap spindle device.

4. The process of claim 1 wherein said continuous rotative movement is imparted to said coated yarn by directing a jet of air introduced under high pressure upon said surface of said yarn.

5. The process of claim 1 wherein said glass fibers are drawn from a spinneret.

6. The process of claim 1 which further comprises directing a flow of a dry inert gas through said fibers as they are formed so as to surround the surface thereof with said gas in an interval between their formation and the coating thereof.

7. The process of claim 1 which further comprises applying at least one additional sizing coating to said treated yarn, each said additional coating application being crosslinked and/or polymerized by a subsequent treatment step.

8. The process of claim 7 wherein said additional coating application is performed with a different sizing coating than that which was first applied to said fibers.

9. The process of claim 1 wherein said continuous rotative movement is imparted to said coated yarn by means for directing a jet of air introduced under high pressure upon the surface of said yarn.

10. The process of claim 1 which further comprises selecting said sizing from among thermoplastic, thermosetting or photosetting compositions.

11. The process of claim 10 wherein said sizing may be applied as a melt, as a suspension or in a solution of a suitable solvent material.

12. The process of claim 11 wherein said sizing further comprises an additive selected from pigments, plasticizers, emulsifiers, softening agents and coupling agents.

13. The process of claim 10 wherein said sizing is a nonaqueous thermoplastic composition having a wax base, said wax selected from among those waxes which are microcrystalline or amorphous and natural or synthetic.

14. The process of claim 13 which further comprises including one or more additive compositions selected from among polyethylenes, polyacrylates, polyamides and polyvinyl acetates with said thermoplastic sizing composition.

15. The process of claim 13 which further comprises cooling said thermoplastic sizing composition subsequent to its deposition upon said fibers by directing a fluid composition at the coated surface of said fibers.

16. The process of claim 10 wherein said sizing is an aqueous thermosetting composition having a base formed of an emulsion of at least one polyester resin, wherein each said at least one resin comprises a nonsaturated organic peroxide emulsion.

17. The process of claim 16, wherein said thermosetting sizing composition is alpha-alpha'-bis-tertiobutyl peroxy diisopropyl benzene.

18. The process of claim 16 which further comprises heat treating said coated yarn along at least a portion of its path.

19. The process of claim 10 wherein said sizing is a photosetting composition comprising:
    at least one monosaturated or polyunsaturated oligomer; and
    at least one photoinitiator compound.

20. The process of claim 19 wherein said at least one oligomer is selected from among acrylate polyesters, modified starches and cellulose, acrylate epoxies, silicon coated compounds and acrylate urethanes.

21. The process of claim 19 wherein said at least one photoinitiator compound is selected from among benzoin, acetophenone, benzophenone, sulfonylacetophenone, a derivative of said benzoin, said acetophenone, or said sulfonylacetophenone and a thioxanthone.

22. The process of claim 19 which further comprises adding at least one organic solvent and/or at least one mono- or poly-unsaturated monomer to said photosetting composition.

23. The process of claim 10 wherein said sizing is a photosetting composition comprising:

at least one monounsaturated or polyunsaturated monomer; and at least one photoinitiator compound.

24. The process of claim 23 wherein said monomer is an acrylic monomer and said photoinitator compound is selected from compositions having a base formed of an emulsion of at least one polyester resin.

25. The process of claim 23 wherein said acrylic monomers are selected from hexane diole diacrylate and trimethylol propane triacrylate.

26. The process of one of claim 19 or 23 which further comprises irradiating said coated yarn with a source of actinic radiation to polymerize and/or crosslink said sizing coating.

27. A process for producing a single twist coated glass yarn which comprises:
    (a) mechanically drawing a plurality of glass fibers formed from strands of molten glass produced by a spinneret apparatus;
    (b) directing a flow of a dry, inert gas through said fibers as they are formed so as to surround the surface thereof with said gas in an interval between their formation and the coating thereof;
    (c) applying a thermoplastic sizing coating to said fibers directly after said fibers exit said spinneret apparatus so as to at least partially coat only an outer surface thereof, said thermoplastic sizing comprising a non-aqueous composition having a wax base selected from among those waxes which are microcrystalline or amorphous and natural or synthetic together with an optional additive selected from among polyethylenes, polyacrylates, polyamides and polyvinyl acetates and applied as a melt, a suspension or in a solution;
    (d) gathering said coated fibers into a yarn;
    (e) passing said coated yarn through a strap spindle device so as to impart a continuous rotative twisting movement to said yarn; and
    (f) cooling said sizing coating subsequent to its deposition upon said fibers so as to cure said sizing by directing a fluid composition upon said coated surface so as to polymerize and/or crosslink said sizing upon said twisted yarn.

28. A process for producing a single twist coated glass yarn which comprises:
    (a) mechanically drawing a plurality of glass fibers formed from strands of molten glass produced by a spinneret apparatus;
    (b) directing a flow of a dry, inert gas through said fibers as they are formed so as to surround the surface thereof with said gas in an interval between their function and the coating thereof;
    (c) applying a thermosetting sizing coating to said fibers directly after said fibers exit said spinneret apparatus so as to at least partially coat only an outer surface thereof, said thermosetting sizing comprising an aqueous composition having a base formed of an emulsion of at least one polyester resin, wherein said at least one resin comprises a monosaturated organic peroxide emulsion;
    (d) gathering said coated fibers into a yarn;
    (e) passing said coated yarn through a strap spindle device so as to impart a continuous, rotative twisting movement to said yarn; and
    (f) heat treating said sizing coating subsequent to its deposition upon said fibers along at least a portion of a path traveled by said coated yarn, so as to cure said thermosetting sizing.

29. A process for producing a single twist coated glass yarn which comprises:
    (a) mechanically drawing a plurality of glass fibers formed from strands of molten glass produced by a spinneret apparatus;
    (b) directing a flow of a dry inert gas through said fibers as they are formed so as to surround the surface thereof with said gas in an interval between their formation and the coating thereof;
    (c) applying a photosetting sizing coating to said fibers directly after said fibers exit said spinneret apparatus so as to at least partially coat only an outer surface thereof said photosetting sizing comprising at least one photoinitiator compound and at least one compound selected from among monsaturated oligomers, polyunsaturated oligomers, monounsaturated monomers and polyunsaturated monomers and optionally at least one additive composition comprising an organic solvent;
    (d) gathering said coated fibers into a yarn;
    (e) passing said coated yarn through a strap spindle device so as to impart a continuous rotative twisting movement to said yarn; and
    (f) irradiating said photosetting sizing coating subsequent to its deposition upon said fibers with a source of actinic radiation in order to polymerize and/or crosslink said sizing upon said yarn.

* * * * *